2,964,486
COATING COMPOSITION

Napoleon M. Bernier, 99 Louise Road, Belmont, Mass.

No Drawing. Filed June 24, 1957, Ser. No. 667,685

2 Claims. (Cl. 260—23)

This invention relates to exterior surface coatings for walls, roofs, and the like and more particularly to surface coating mastic compositions.

Heretofore considerable effort has been directed to produce coatings that (a) can be applied easily and smoothly by trowel in thicknesses greater than paints; (b) will adhere well to various materials such as asbestos board, wood, masonry, brick, and tile; (c) will harden into a firm weather-resistant water-proof coating; (d) will harden rapidly; and (e) include selected aggregates in various colors and sizes which are dispersed and held fixed in a binder so as to produce various novel and decorative surface effects.

Although many attempts have been made to produce compositions of the type contemplated by the present invention, I have found them to be lacking in one or more of the aforementioned desired characteristics or to be unsatisfactory for other reasons, as for example, detracting from the beauty of the aggregates, involving relatively large proportions of expensive solvents, lacking the ability to expand or contract with the supporting surface without fracture or rupture, having short life, or lacking homogeneity or stability whereby the aggregates are not uniformly dispersed or tend to settle out or migrate before the coating becomes hard enough to bind them.

Accordingly it is the primary object of this invention to provide a new and improved surface coating mastic composition particularly suitable for use out-of-doors that comprises aggregates suspended and dispersed in a plastic binder which can be applied by trowel in various thicknesses to various surfaces and which will harden rapidly to form a durable decorative coating.

Another object of this invention is to provide a composition comprising selected colored aggregates and a viscous vehicle therefor comprising a plastic binder dissolved in a volatile organic solvent, the vehicle being capable of hardening rapidly to a transparent mass that firmly binds the aggregates without concealing their true colors.

It is the specific object of this invention to provide a mastic coating composition for application to exterior walls, roofs and the like, which composition comprises selected colored aggregates, a vehicle therefor comprising a commercial acrylic resin dissolved in an organic solvent, the solvent being capable of evaporating whereby the resin will act to bind the aggregates in a hard weather-resistant coating, and a jelling agent for holding the aggregates in suspension in the resin and for rendering the composition thick so that it may be applied by a trowel.

Other objects and many of the attendant advantages of this invention will be readily appreciated as the same becomes better understood by reference to the following detailed description.

I have discovered that acrylic resins dissolved in an organic solvent and mixed with a jelling agent provides a vehicle adapted to receive and suspend suitable clear or colored aggregates and to form with said aggregates a mastic-like or pasty composition having a consistency whereby it can be spread on a surface with a trowel and applied to a desired thickness, and which when applied will dry rapidly to form a hard, weather-resistant, waterproof and decorative coating.

By way of example and not by way of limitation, the resin component of the present invention may be polymers of methyl methacrylate, butyl methacrylate, isobutyl methacrylate, ethyl methacrylate, methyl acrylate, ethyl acrylate, and propyl acrylate, or copolymers or combinations thereof. These resins are dissolved in suitable organic solvents. By way of example and not by way of limitation, the organic solvent may be an aromatic hydro-carbon such as xylol, toluol, benzol, hi-flash naphtha, and mineral spirits.

Various jelling agents may be used to suspend the aggregates. The following materials are suitable jelling agents: Thixcin, a finely divided, solidified hydrogenated castor oil; Bentone 34, an organic bentonite derivative (dimethyldioctadecyl ammonium bentonite); Cabosil, a micro-size colloidal silica; Jel Aid, an aluminum octoate; and aluminum stearate.

The type of aggregate that may be added to the vehicle is variable. Thus, for example, vari-colored stones, colored or white marble, granite, colored glass, porcelain, slag, and colored roofing granules may be employed to produce single or multiple colored combinations. For best results the colored stones should be graded to remove all particles smaller than 1/32 inch since the presence of fine powders or particles below 1/32 inch in diameter has been found to detract from the strength of the coating. The aggregates must have a diameter no smaller than 1/32 inch and no larger than approximately 3/8 inch.

Considered broadly, the compositions produced according to the present invention are formulated in such a manner that the resin solutions (comprising the resins and the solvents therefor) will comprise from 20% to 40% by weight of resin solids. From the standpoint of the total mixture, the resin will be present in amounts ranging from 4% to 12%, the stones or aggregates in amounts ranging from 50% to 80%, and the thickener or jelling agent in amounts ranging from 1/2% to 5% and preferably from 1/2% to 2%, with the solvent for the resin making up the rest of the total mixture.

It is to be noted that the jelling agents recited above are all in solid form and that, with the exception of the bentonite which is cream-colored, they are all white in color. Similarly the resins are clear or translucent so as to enhance or emphasize the natural colors of the aggregates. The white color of the jelling agents has been found to materially enhance the final product and to emphasize rather than detract from the natural colors of the aggregate.

With respect to the resins it is to be noted that they are all in polymer form, but are dissolved in organic solvents. Accordingly the hardening process is not one of polymerization but simply an evaporation process whereby the volatile organic solvents vaporize, leaving the resin in the form of a hard matrix surrounding the colored aggregates.

Following are a few examples of the compositions which I have formulated according to the present invention. In each example the percentages are by weight.

Example I:                                              Percent
   Xylol _____   18
   Thixcin—a castor oil derivative_____    1
   Methyl methacrylate polymer_____    7
   Colored stone aggregates_____   74

Example II:

| | |
|---|---|
| Mineral spirits | 5 |
| Xylol | 15 |
| Ethyl acrylate polymer | 12 |
| Bentone—an organic bentonite derivative | 1 |
| Marble aggregates | 67 |

Example III:

| | |
|---|---|
| Mineral spirits | 12½ |
| Xylol | 5 |
| Butyl methacrylate polymer | 4½ |
| Cabosil—a microsize silica | 1½ |
| Granite aggregates | 76½ |

Example IV:

| | |
|---|---|
| Mineral spirits | 15 |
| Xylol | 5 |
| Lucite—a copolymer of butyl and isobutyl methacrylate | 7 |
| Hydrogenated caster oil | 1 |
| White crushed stone | 74 |

It has been found that compositions like the compositions of the foregoing examples are easy to prepare, have the desired consistency and are easily applied by trowel. Moreover, they set rapidly, are exceptionally stable under various atmospheric conditions, are especially decorative, and exhibit the aggregates contained therein in their true colors.

Although I have disclosed several examples of my invention, it is obvious that other modifications and variations are possible in the light of the above teachings. Therefore, it is to be understood that the invention is not limited in its details and combinations to the details and combinations specifically described or suggested and that within the scope of the appended claims it may be practiced otherwise than as specifically described or suggested.

I claim:

1. A trowelable mastic composition for application to walls, comprising by weight 50% to 80% aggregates selected from the group consisting of vari-colored stone, marble, granite, colored glass, porcelain, and slag, said aggregates being 1/32 to 3/8 inch in diameter, 4% to 12% clear resin from the class consisting of methyl methacrylate polymer, butyl methacrylate polymer, isobutyl methacrylate polymer, ethyl methacrylate polymer, methyl acrylate polymer, ethyl acrylate polymer, and propyl acrylate polymer, ½% to 5% jelling agent from the class consisting of dimethyldioctadecyl ammonium bentonite, colloidal silica, aluminum octoate, aluminum stearate, and hydrogenated castor oil, and the remainder a volatile solvent for said resin from the group consisting of xylol, mineral spirits, toluol, benzol, and naphtha.

2. A trowelable mastic composition for application to walls, comprising by weight 50% to 80% aggregates selected from the group consisting of vari-colored stone, marble, granite, colored glass, porcelain, and slag, said aggregates being 1/32 to 3/8 inch in diameter, 4% to 12% clear resin from the group consisting of polymers and copolymers of methyl methacrylate, butyl methacrylate, isobutyl methacrylate, ethyl methacrylate, methyl acrylate, ethyl acrylate, and propyl acrylate, ½% to 5% jelling agent from the class consisting of dimethyldioctadecyl ammonium bentonite, colloidal silica, aluminum octoate, aluminum stearate, and hydrogenated castor oil, and the remainder a volatile solvent for said resin from the group consisting of xylol, mineral spirits, toluol, benzol, and naphtha.

References Cited in the file of this patent

UNITED STATES PATENTS

| | | |
|---|---|---|
| 1,361,763 | Hamil | Dec. 7, 1920 |
| 2,078,007 | Lurie | Apr. 20, 1937 |
| 2,273,780 | Dittmar | Feb. 17, 1942 |
| 2,343,925 | Pike | Mar. 14, 1944 |
| 2,397,744 | Kertesz | Apr. 2, 1946 |
| 2,411,470 | Shaw | Nov. 19, 1946 |
| 2,413,259 | Soday | Dec. 24, 1946 |
| 2,650,909 | Betsch et al. | Sept. 1, 1953 |
| 2,658,002 | Schwefsky | Nov. 3, 1953 |
| 2,753,314 | Severs et al. | July 3, 1956 |
| 2,794,791 | Patton et al. | June 4, 1957 |